(12) United States Patent
Poplin

(10) Patent No.: US 7,430,002 B2
(45) Date of Patent: Sep. 30, 2008

(54) DIGITAL IMAGING SYSTEM AND METHOD FOR ADJUSTING IMAGE-CAPTURING PARAMETERS USING IMAGE COMPARISONS

(75) Inventor: Dwight Poplin, Corvallis, OR (US)

(73) Assignee: Micron Technology, Inc., Boise, ID (US)

( * ) Notice: Subject to any disclaimer, the term of this patent is extended or adjusted under 35 U.S.C. 154(b) by 662 days.

(21) Appl. No.: 09/970,611

(22) Filed: Oct. 3, 2001

(65) Prior Publication Data

US 2003/0063213 A1   Apr. 3, 2003

(51) Int. Cl.
*H04N 5/235*  (2006.01)
*H04N 5/222*  (2006.01)
*G03B 7/00*  (2006.01)

(52) U.S. Cl. ............ 348/229.1; 348/230.1; 348/333.05; 348/362

(58) Field of Classification Search ......... 348/362–368, 348/296, 229.1, 230.1, 333.05, 222.1, 223.1
See application file for complete search history.

(56) References Cited

U.S. PATENT DOCUMENTS

| | | | |
|---|---|---|---|
| 5,402,170 A | 3/1995 | Parulski et al. | 348/211 |
| 6,005,613 A | 12/1999 | Endsley et al. | 348/231 |
| 6,285,398 B1 * | 9/2001 | Shinsky et al. | 348/223.1 |
| 6,665,007 B1 * | 12/2003 | Usami | 348/223.1 |
| 6,906,751 B1 * | 6/2005 | Norita et al. | 348/349 |
| 2004/0169767 A1 * | 9/2004 | Norita et al. | 348/350 |
| 2005/0185055 A1 * | 8/2005 | Miller et al. | 348/207.1 |

* cited by examiner

*Primary Examiner*—Lin Ye
*Assistant Examiner*—Kelly Jerabek
(74) *Attorney, Agent, or Firm*—RatnerPrestia

(57) ABSTRACT

A digital imaging system and method for manually adjusting the image-capturing parameters of a digital imaging device of the system utilizes a comparative image scheme that allows users to adjust the image-capturing parameters by selecting the most preferable image from a number of comparison images, which are produced using different settings of the image-capturing parameters. The comparative image scheme provides an intuitive technique for users to manually set the image-capturing parameters of the digital imaging device without having to learn about the image-capturing parameters and their effects on captured images.

16 Claims, 5 Drawing Sheets

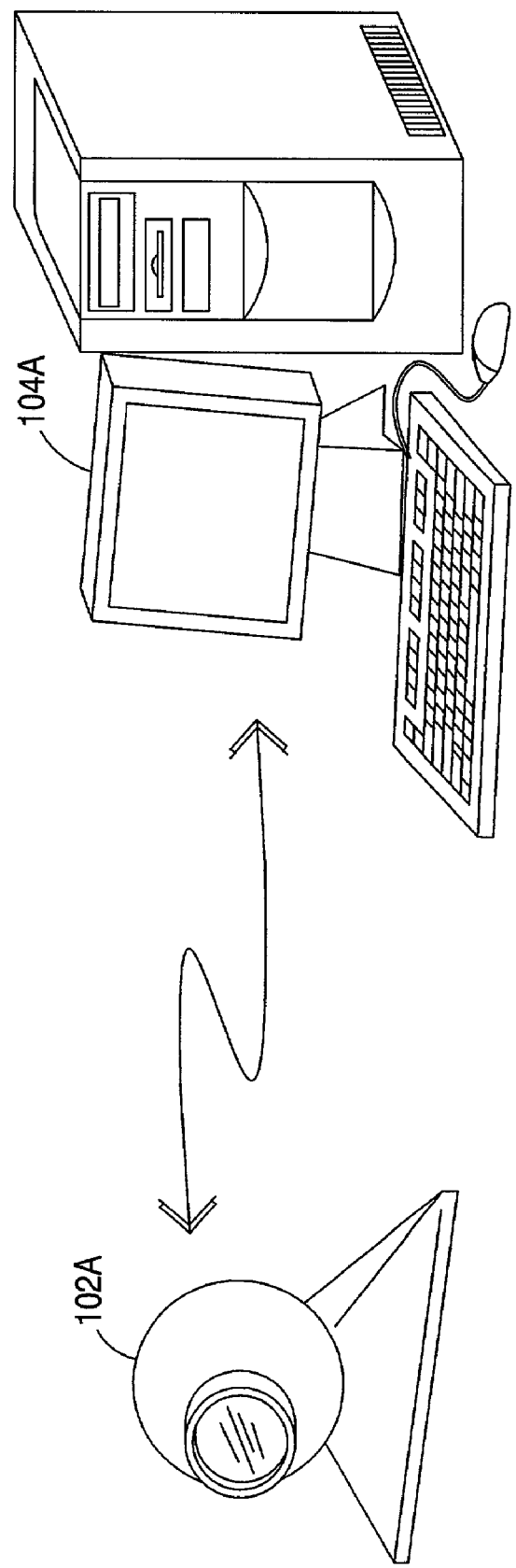

DIGITAL IMAGING SYSTEM AND METHOD FOR ADJUSTING IMAGE-CAPTURING PARAMETERS USING IMAGE COMPARISONS

FIELD OF THE INVENTION

The invention relates generally to image-capturing systems, and more particularly to a digital imaging system and method for adjusting the image-capturing parameters of the system.

BACKGROUND OF THE INVENTION

Digital imaging devices are becoming more common in the consumer marketplace, partly due to progressive price reductions. Digital imaging devices include not only standard digital cameras, but also PC-connected digital cameras and peripheral digital camera attachments. PC-connected digital cameras are cameras that are designed to be connected to and controlled by a host personal computer. These PC-connected digital cameras are also known as "web cams". Peripheral digital camera attachments are personal digital assistant (PDA) accessories that can be attached to a PDA so that the PDA can function as a digital camera.

Digital imaging devices typically employ a single image sensor, either a charge coupled device (CCD) sensor or a complementary metal oxide semiconductor (CMOS) sensor, to digitally capture a scene of interest as raw image data. The raw image data are then processed using a number of image-capturing parameters, such as white balance, color saturation, contrast, brightness, hue and gamma correction. In most digital imaging devices, an algorithm is used to automatically adjust these image-capturing parameters based on, for example, statistical measurements of the raw image data. Although this algorithm usually produces acceptable images, there are situations when the algorithm fails to correctly adjust the image-capturing parameters, which may result in lower quality images.

A solution to resolving the above-described problem is to override the parameter-adjusting algorithm and to manually adjust the image-capturing parameters. As an example, for most PC-connected digital cameras, one or more image-capturing parameters may be manually adjusted using accompanying software running on the host computer. Thus, in situations when the parameter-adjusting algorithm fails to correctly adjust the image-capturing parameters, a user may manually adjust the image-capturing parameters using the accompanying software to subsequently capture images of desired quality.

A concern with using accompanying software to manually adjust the image-capturing parameters of a digital imaging device is that a typical camera user may have no idea how to adjust the image-capturing parameters to bring about a desired change in the captured images. Thus, the user may apply a trial-and-error technique to bring about the desired changes. However, the use of such a crude technique to adjust the image-capturing parameters will most likely be very time consuming.

Another solution to resolving the parameter-adjusting algorithm failure is to enhance the images after the images have been captured by the digital imaging device, i.e., post-processing of captured images. Thus, the post-processing image enhancements can compensate for the effects of the parameter-adjusting algorithm failure in the captured images. There are a number of post-processing software applications that can enhance captured images. One software application of interest is the post-processing software sold under the trademark PHOTOGENETICS from QBeo, Inc. The QBeo software is designed to help users improve the quality of captured images. This program modifies a given captured image and then shows the original image and the modified image side by side. The user then rates the two images and the program progressively refines the image in several iterations. Another software application of interest is the post-processing software sold under the trademark ADOBE PHOTOSHOP from Adobe Systems Incorporated. The Adobe software includes a feature that shows the user six versions of a current image for selection in which the color has been slightly adjusted in six different directions. When the user selects a modified image, the selected image becomes the new "current" image. The user can iterate until the current image cannot be further improved.

A concern with the use of post-processing software to correct the parameter-adjusting algorithm failure in the digital imaging device is that each individual captured image must be enhanced using the software. Thus, if multiple images are captured using, for example, an incorrect brightness setting, then each captured image must be individually processed using the post-processing software to compensate for the incorrect brightness setting. Clearly, a better solution to correct the parameter-adjusting algorithm failure is to adjust the image-capturing parameters of the digital imaging device to the proper settings.

In view of these concerns, there is a need for a digital imaging system and method for adjusting the image-capturing parameters of the system that allows the user to more intuitively adjust the parameters in an efficient manner.

SUMMARY OF THE INVENTION

A digital imaging system and method for manually adjusting the image-capturing parameters of a digital imaging device of the system utilizes a comparative image scheme that allows users to adjust the image-capturing parameters by selecting the most preferable image from a number of comparison images, which are produced using different settings of the image-capturing parameters. The comparative image scheme provides an intuitive technique for users to manually set the image-capturing parameters of the digital imaging device without having to learn about the image-capturing parameters and their effects on captured images.

A method for manually adjusting the image-capturing parameters of a digital imaging device in accordance with the invention includes the steps of capturing a first image and a second image using different settings of the image-capturing parameters, displaying the first and second images as comparison images for user selection, and adjusting the current settings of the image-capturing parameters of the digital imaging device to conform with one of the first and second images selected by a user. The method may further include the step of capturing a third image using the current settings of the image-capturing parameters that were adjusted to conform with one of the first and second images selected by the user.

In some embodiments, the step of capturing the first and second images includes processing raw image data of a captured scene of interest using a first setting of a selected image-capturing parameter to capture the first image, and processing the raw image data using a second setting of the selected image-capturing parameter to capture the second image. In other embodiments, the step of capturing the first and second images includes sequentially capturing a scene of interest using two different settings of a selected image-capturing parameter to capture the first and second images.

In some embodiments, the step of displaying the first and second images includes simultaneously displaying the first and second images. In other embodiments, the step of displaying the first and second images includes sequentially displaying the first and second images.

A digital imaging system in accordance with the invention includes a digital imaging device that is configured to electronically capture images using different settings of image-capturing parameters, a display device that is configured to visually present a first captured image corresponding to first settings of the image-capturing parameters and a second captured image corresponding to second settings of the image-capturing parameters, and a parameter adjuster operatively coupled to the digital imaging device that is configured to adjust the current settings of the image-capturing parameters of the digital imaging device to conform to one of the first settings and the second settings in response to a user selection between the first captured image and the second captured image presented on the display device. The digital imaging device may be a standard digital camera, a PC-connected digital camera, or a peripheral digital camera attachment.

In some embodiments, the parameter adjuster is configured to direct a processor to process raw image data of a captured scene of interest using one setting of a selected image-capturing parameter to capture the first captured image, and to direct the processor to process the raw image data using another setting of the selected image-capturing parameter to capture the second captured image. In other embodiments, the parameter adjuster is configured to direct the digital imaging device to sequentially capture a scene of interest using two different settings of a selected image-capturing parameter to produce the first and second captured images.

In some embodiments, the parameter adjuster is configured to direct the display device to simultaneously display the first and second captured images. In other embodiments, the parameter adjuster is configured to direct the display device to sequentially display the first and second captured images.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 2A illustrates the digital imaging system in accordance with a first embodiment, which includes a PC-connected digital camera and a host personal computer.

DETAILED DESCRIPTION

Figure 1:
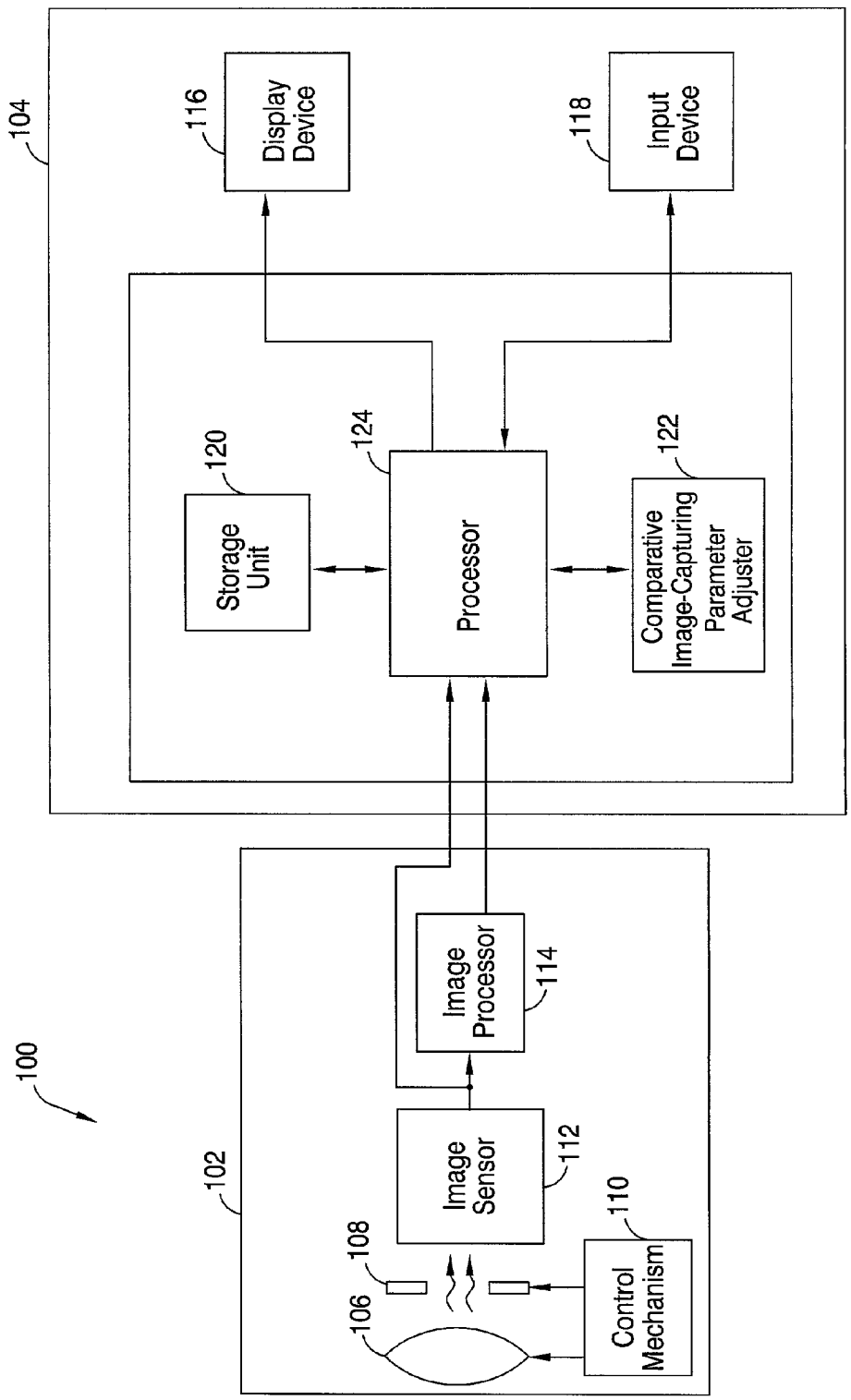
FIG. 1 is a block diagram of a digital imaging system in accordance with the present invention.

With reference to FIG. 1, a digital imaging system 100 in accordance with the invention is shown. The digital imaging system 100 includes a digital imaging device 102 and a host computer 104. The digital imaging device operates to capture images using a number of image-capturing parameters. The host computer is designed to allow a user to manually adjust the image-capturing parameters of the digital imaging device. In operation, the host computer presents comparison images that have been captured using different settings of the image-capturing parameters to allow a user to easily adjust the image-capturing parameters of the digital imaging device to desired settings by simply selecting the most visually preferable image from the presented comparison images. The use of comparison images provides an intuitive way for users to manually adjust the image-capturing parameters of the digital imaging device without having to learn about the image-capturing parameters.

Figure 2B:
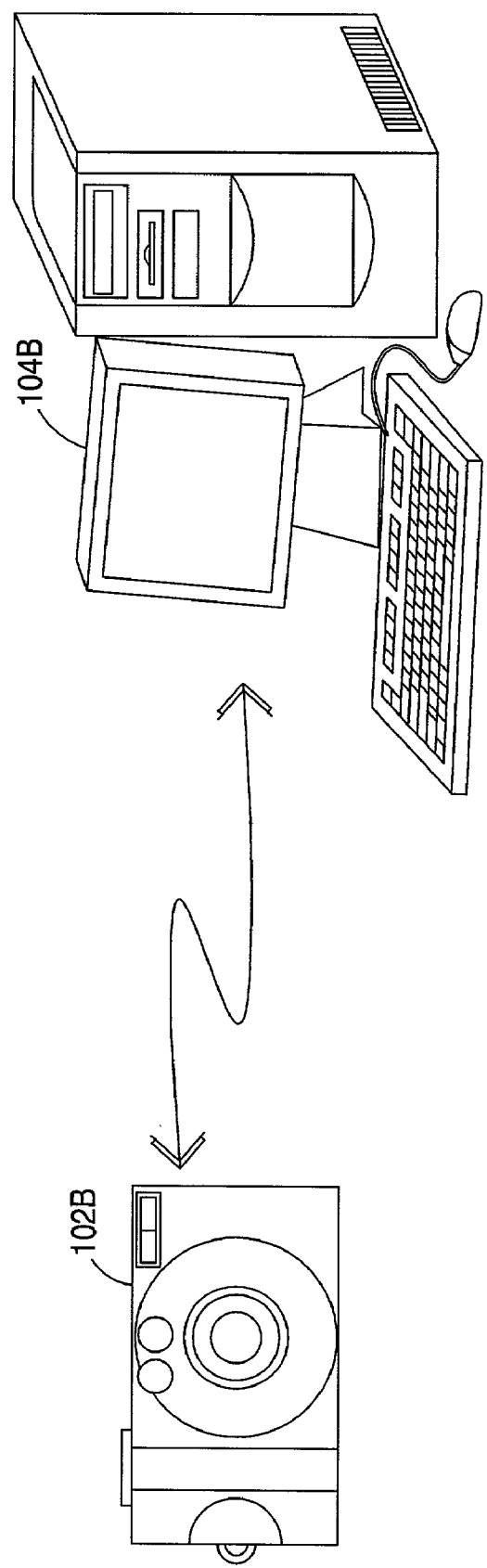
FIG. 2B illustrates the digital imaging system in accordance with a second embodiment, which includes a standard digital camera and a host personal computer.
Figure 2C:
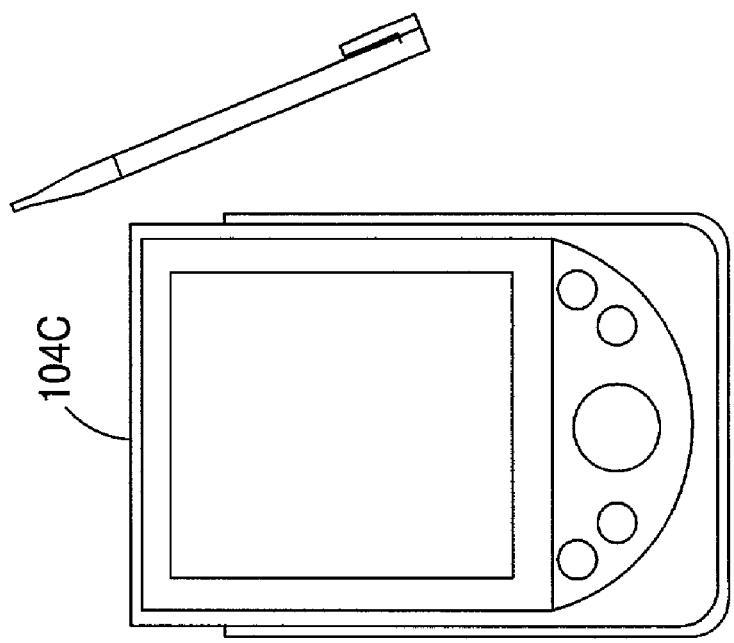
FIG. 2C illustrates the digital imaging system in accordance with a third embodiment, which includes a peripheral digital camera attachment and a host personal digital assistant.
Figure 2C:
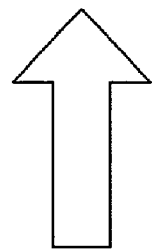
Figure 2C:
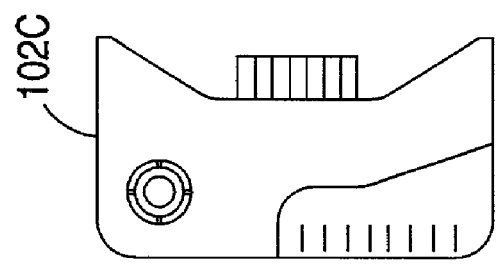

There are number of different embodiments for the digital imaging system 100. In a first embodiment, the digital imaging device 102 is a PC-connected digital camera 102A and the host computer 104 is a personal computer (PC) 104A, as illustrated in FIG. 2A. In a second embodiment, the digital imaging device is a standard digital camera 102B and the host computer is a PC 104B, as illustrated in FIG. 2B. In these embodiments, the digital imaging device can be physically connected to the host computer via USB port or other suitable computer port. Alternatively, the digital imaging device may be designed to be wirelessly connected to the host computer. In a third embodiment, the digital imaging device is a peripheral digital camera attachment 102C and the host computer is a personal digital assistant (PDA) 104C, as illustrated in FIG. 2C. In this embodiment, the digital imaging device is designed to be attached to the host computer, so that the combined apparatus can function as a digital camera. In other embodiments, the digital imaging device and the host computer may be integrated to form a single digital imaging apparatus. Although the digital imaging system is described as capturing still images, the digital imaging system may be configured to capture streams of images or videos.

Turning back to FIG. 1, the digital imaging device 102 comprises a lens assembly 106, an optional mechanical shutter 108, a control mechanism 110, an image sensor 112 and an image processor 114. The control mechanism operates to adjust the lens assembly in order to focus a scene of interest onto the image sensor. In addition, the control mechanism can adjust the aperture of the lens assembly to control the depth of field. In some embodiments, the lens assembly may be fixed with respect to focus and aperture. Consequently, in these embodiments, the control mechanism does not control the lens assembly. In addition to the control of the lens assembly, the control mechanism can open and close the mechanical shutter to control the integration or exposure periods for the image sensor. During an exposure period, the image sensor electronically captures a scene of interest as raw image data by accumulating charges. If the digital imaging device does not include the optional mechanical shutter, then the exposure periods are controlled by electronically adjusting the duration when the image sensor is allowed to accumulate charges. This is accomplished by first clearing the image sensor of existing charges, which begins an exposure period, and then quickly reading out accumulated charges after a predefined amount of time, which ends the exposure period.

The image sensor 112 of the digital imaging device 102 may be a CCD sensor, a complementary metal oxide semiconductor (CMOS) sensor, or any other type of photosensitive sensor used to electronically capture images. The image sensor may be configured such that white balance may be adjusted by the image sensor. The image sensor generates raw image data that corresponds to the captured scene of interest, which is transmitted to the image processor 114 and the host computer 104.

The image processor 114 of the digital imaging device 102 operates to process the raw image data from the image sensor to generate a digital color image using the current settings of image-capturing parameters, such as color saturation, contrast, brightness, hue, gamma correction and white balance (if not adjusted by the image sensor 112). As described below, these image-capturing parameters can be manually set using the host computer 104.

The host computer 104 comprises a display device 116, an input device 118, a storage unit 120, a comparative image-capturing parameter adjuster 122, and a processor 124. If the host computer is a PC, then the display device may be a computer monitor and the input device may be a keyboard and a computer mouse. However, if the host computer is a PDA, then the display device may be an LCD display and the input device may be a number of buttons and/or dials on the PDA. Furthermore, if the LCD display is a touch-screen display, then the LCD display may also function as an input device. The storage unit 120 of the host computer may be a computer hard drive, a flash memory card, or any other storage medium.

The comparative image-capturing parameter adjuster 122 of the host computer 104 operates to adjust the image-capturing parameters of the digital imaging device 102 based on the personal preferences of a user. The comparative image-capturing parameter adjuster allows the user to manually adjust one or more of the image-capturing parameters of the digital imaging device by selecting the most preferred image from a number of displayed images. This process can then be repeated to fine-tune the image-capturing parameters being adjusted or to adjust other image-capturing parameters. Thus, the comparative image-capturing parameter adjuster allows any user to adjust the image-capturing parameters of the digital imaging device in an intuitive manner without having to learn about the image-capturing parameters and their effects on captured images.

When user initiated, the comparative image-capturing parameter adjuster 112 directs the display device to simultaneously present at least two versions of the captured image. That is, at least two versions of the captured image are displayed side by side on the display device. Each version of the captured image is produced using different image-capturing parameter settings. If two versions of the captured image are presented, one of the two versions is produced using the current settings of the image-capturing parameters, while the other version is produced using modified settings for the parameters in which a selected image-capturing parameter is adjusted in a first direction, e.g., increased or decreased. If more than two versions of the captured image are presented, the additional versions may include versions that are produced using different settings for the selected image-capturing parameter in the first direction. Alternatively, the additional versions of the captured image may include versions that are produced using different settings for the selected image-capturing parameter in which the selected parameter is adjusted in a new direction.

The number of versions presented to the user mostly depends on the display device 116 of the host computer 104. Thus, if the display device has a large viewing screen, the comparative image-capturing parameter adjuster 122 may present five or more versions of the captured image. However, if the display device has a limited viewing screen, the comparative image-capturing parameter adjuster may present only two versions of the captured image. In an alternative configuration, the different versions may be sequentially displayed on the display device.

Using the input device 118 of the host computer 104, the user is able to select one of the presented versions that the user prefers over the remaining versions. The comparative image-capturing parameter adjuster 122 then adjusts the corresponding image-capturing parameter of the digital imaging device 102 according to the selected version of the captured image. This comparative process is then repeated to further adjust or fine-tune the selected image-capturing parameter or to adjust different image-capturing parameters. Consequently, each image-capturing parameter of the digital imaging device can be adjusted using the comparative image-capturing parameter adjuster. Thus, the comparative image-capturing parameter adjuster allows the user, who may not have any knowledge about the image-capturing parameters and their effects on the resulting images, to manually set the image-capturing parameters of the digital imaging device by simply selecting the most preferable image from a number of images presented on the display device 116.

Although the comparative image-capturing parameter adjuster 122 is illustrated as a separate unit, the comparative image-capturing parameter adjuster represents a functional block, and consequently, may or may not be embodied in the form of a physical component of the host computer 102. In the exemplary embodiment, the comparative image-capturing parameter adjuster is embodied in the host computer as software. However, the comparative image-capturing parameter adjuster may be embodied in any combination of hardware, firmware and/or software.

Figure 3:
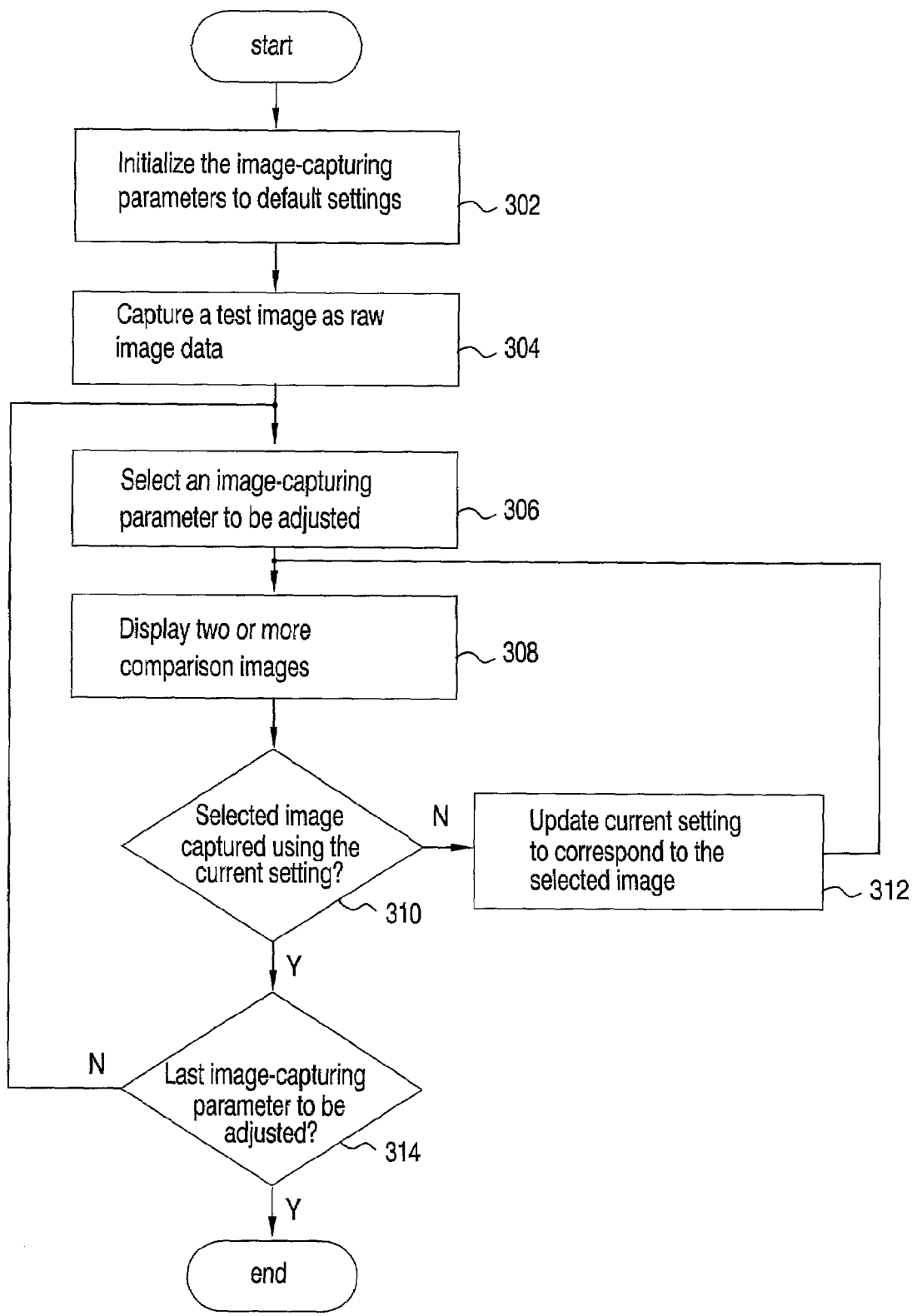
FIG. 3 is a process flow diagram of a method of manually adjusting the image-capturing parameters in accordance with the present invention.

A method of manually adjusting the image-capturing parameters of the digital imaging device 102 in accordance with the invention is now described with reference to the process flow diagram of FIG. 3. At step 302, the image-capturing parameters of the digital imaging device 102 are initialized to default settings. Next, at step 304, a test image of a scene of interest is captured by the image sensor 112 of the digital imaging device as raw image data, which is transmitted to the comparative image-capturing parameter adjuster 122 of the host computer 104. At step 306, an image-capturing parameter is selected to be adjusted. Next, at step 308, two or more comparison images are displayed on the display device 116 of the host computer so that the user can select the most preferred image, and consequently, adjust the selected image-capturing parameter. One of the comparison images is processed using the current setting for the selected image-capturing parameter. However, the other comparison images are processed using different settings for the selected image-capturing parameter.

Next, at step 310, when the user has selected one of the comparison images as the most preferred image, a determination is made whether the selected image has been processed using the current setting for the selected the image-capturing parameter. If so, the process proceeds to step 314. However, if the selected image has been processing using a different setting for the selected image-capturing parameter, then the process proceeds to step 312, at which the selected image-capturing parameter is updated to a setting that corresponds to the selected image. That is, the selected image-capturing parameter is adjusted to the setting that was used to produce the selected comparison image. The process then proceeds back to step 308, at which additional comparison images are displayed on the display device 116 of the host computer for user selection. The displayed comparison images include the last selected image and one or more images that are processed using different settings for the selected image-capturing parameter. These different settings for the selected image-capturing parameter are settings that have not been previously used.

At step 314, a determination is made whether the selected image-capturing parameter is the last parameter to be adjusted. If so, the process comes to an end. However, if the selected image-capturing parameter is not the last parameter, the process proceeds back to step 306, at which the next image-capturing parameter to be adjusted is selected. Steps 308-314 are then repeated for the newly selected image-capturing parameter. In this fashion, the image-capturing parameters of the digital imaging device 102 are adjusted to settings that correspond with the preferences of the user. The adjusted parameter settings can then be used to capture subsequent images, which ensures that these subsequent images will be satisfactory to the user.

Although the method of manually adjusting the image-capturing parameters of the digital imaging device 102 has been described as adjusting only one of the image-capturing parameters at each iteration, the comparative image-capturing parameter adjuster 122 may be modified such that two of more image-capturing parameters may be adjusted at each iteration. In this configuration, the comparison images are processed using different settings for two or more image-capturing parameters.

The comparative image-capturing parameter adjuster 122 may be configured to adjust only image-capturing parameters that typically involve image processing, such as white balance, color saturation, contrast, brightness, hue and gamma correction. However, the comparative image-capturing parameter adjuster may be configured to adjust other image-capturing parameters that do not involve image processing, such as exposure period and aperture. The image-capturing parameters that do not involve image processing are referred herein as "non-processing image-capturing parameters". In contrast, image-capturing parameters that involve image processing are referred herein as "processing image-capturing parameters". As previously described, for the processing image-capturing parameters of the digital imaging device 102, given raw image data is processed using different settings of the image-capturing parameters to present different versions of the raw image data to the user so that the user can select the most preferred version to adjust the parameters accordingly. However, for the non-processing image-capturing parameters, the different versions of a raw image data cannot be produced in such a manner since these parameters do not involve image processing. Thus, for the non-processing image-capturing parameters, comparison images with different settings of one or more non-processing image-capturing parameters must be produced in an indirect fashion.

There are two approaches for presenting comparison images with different settings of one or more non-processing image-capturing parameters to the user. The first approach involves simulating the comparison images that would result from different settings of the non-processing image-capturing parameters. For example, if the non-processing image-capturing parameter of interest is exposure period, then simulated images that represent images captured using different exposure periods are generated and presented to the user on the display device 116 of the host computer 104. The second approach involves actually capturing additional images using different settings of the non-processing image-capturing parameters. Using the above example, in this approach, images are sequentially captured using different exposure periods, and then, these images are presented as comparison images to the user. Thus, the comparison images are not identical images of a captured scene. However, if the same scene is used to sequentially capture images, these captured images will be similar enough to serve as comparison images. Using one of the two approaches, comparison images can be presented to the user for selection. The non-processing image-capturing parameter of interest can then be adjusted in accordance with the selected comparison image. Thus, the digital imaging system 100 may be configured so that the non-processing image-capturing parameters, as well as the processing image-capturing parameters, may be manually adjusted by the user using a comparative image process.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of adjusting image-capturing parameters of an image-capturing device comprising:

capturing, by the image-capturing device, raw image data of a single image of a captured scene of interest;

sending, by the image-capturing device, the raw image data of the single captured image to an external computer, located externally from the image-capturing device;

processing, by an external computer, the raw image data of the single captured image using a first setting of a selected image-capturing parameter for display as a first image;

processing, by the external computer, the raw image data of the single captured image using a second setting of the selected image-capturing parameter for display as a second image;

displaying the first and second images, as comparison images on a display coupled to the external computer;

selecting, by a user of the external computer, one of the comparison images;

processing, by the external computer, the raw image data of the single captured image using a third setting of the selected image-capturing parameter for display as a third image;

displaying on the display coupled to the external computer: (1) the selected one of the first and second images and (2) the third image as further comparison images;

selecting, by the user of the external computer, one of the further comparison images; and adjusting, by the image-capturing device, current settings of the image-capturing parameters of the image-capturing device to conform with the one of the further comparison images selected by the user, wherein the selected image-capturing parameter is a control parameter for setting an exposure period or an aperture of the image-capturing device.

2. The method of claim 1, wherein the step of displaying the first and second images includes sequentially displaying the scene of interest using two different settings of the selected image-capturing parameter.

3. The method of claim 1, wherein the step of displaying the first and second images includes simultaneously displaying the first and second images.

4. The method of claim 1, wherein the step of displaying the first and second images includes sequentially displaying the first and second images.

5. The method of claim 1, further comprising capturing raw image data of another image using the current settings of the image-capturing parameters as the settings to produce the other image.

6. The method of claim 1, wherein the processing of the raw image data using one of the first setting or the second setting of the selected image-capturing parameter includes generating a simulated image that represents the single captured image using the first or second setting of the selected image-capturing parameter to produce said second image.

7. An imaging system comprising:
an image-capturing device that is configured to electronically capture raw image data of a single image;
a processor for processing the raw image data of the single captured image using different settings of a selected image-capturing parameter for display;
a display device that is configured to visually present the raw image data of the single captured image using at least two different settings of the image-capturing parameters, as a first set of comparison images;
a selector for selecting one comparison image of the first set of comparison images,
wherein the display device visually presents a second set of comparison images, the second set of comparison images including the selected comparison image and at least one other image of the raw image data of the single captured image using at least one other set of different settings of the image-capturing parameters, the selector selecting one further comparison image of the second set of comparison images; and
a parameter adjuster operatively coupled to the image-capturing device, the parameter adjuster being configured to adjust current settings of the image-capturing parameters of the image-capturing device to conform to the setting of the image-capturing parameters associated with the one further comparison image, the parameter adjuster being configured to direct the processor to process raw image data of another image using the adjusted setting of the selected image-capturing parameters,
wherein at least one of the image-capturing parameters used to visually present the raw image data of the single captured image is a control parameter for setting an exposure period or an aperture of the image-capturing device.

8. The imaging system of claim 7, further comprising selecting a further image-capturing parameter for adjustment, the further image-capturing parameter including a parameter selected from a group consisting of color saturation, contrast, brightness, hue, gamma correction and white balance.

9. The imaging system of claim 7, wherein the parameter adjuster is configured to direct the display device to simultaneously display the first set of comparison images or the second set of comparison images.

10. The imaging system of claim 7, wherein the parameter adjuster is configured to direct the display device to sequentially display the first set of comparison images or the_second set of comparison images.

11. The imaging system of claim 7, wherein the parameter adjuster is configured to generate simulated images that represents the single image captured using the second setting of the selected image-capturing parameter to produce said second set of images.

12. A method of adjusting image-capturing parameters of an image-capturing device comprising:
capturing a single image of a scene of interest as raw image data using an image sensor of the image-capturing device;
processing the raw image data using a first setting of a first selected image-capturing parameter to produce a first image of the scene of interest;
processing the raw image data using a second setting of the first selected image-capturing parameter to produce a second image of the scene of interest;
displaying the first and second images;
selecting, by a user, one of the first and second images;
repeating the processing steps using the raw image data of the single image and the displaying step using a first setting and a second setting of a second selected image-capturing parameter to produce third and fourth images of the scene of interest;
selecting, by the user, one of the third and fourth images;
adjusting current settings of the image-capturing parameters of the image-capturing device to conform with the selected ones of the first and second settings of the first and second selected image-capturing parameters, the adjusted current settings of the image-capturing parameters being used by the image-capturing device to capture a subsequent image, wherein at least one of the first or second image-capturing parameters is a control parameter for setting an exposure period or an aperture of the image-capturing device.

13. The method of claim 12, wherein another one of the first or second image-capturing parameters is selected from a group consisting of color saturation, contrast, brightness, hue, gamma correction and white balance.

14. The method of claim 12, wherein the step of displaying the first and second images includes simultaneously displaying the first and second images.

15. The method of claim 12, wherein the step of displaying the first and second images includes sequentially displaying the first and second images.

16. The method of claim 12, wherein the processing of the raw image data using the second settings of the image-capturing parameters includes generating a simulated image that represents the single captured image using the second settings of the image-capturing parameters to produce said second image.

* * * * *

UNITED STATES PATENT AND TRADEMARK OFFICE
CERTIFICATE OF CORRECTION

PATENT NO. : 7,430,002 B2  Page 1 of 1
APPLICATION NO. : 09/970611
DATED : September 30, 2008
INVENTOR(S) : Dwight Poplin It is certified that error appears in the above-identified patent and that said Letters Patent is hereby corrected as shown below:

In column 9, line 47, in Claim 10, delete "the_second" and insert -- the second --, therefor.

Signed and Sealed this

Twenty-fifth Day of November, 2008

JON W. DUDAS
*Director of the United States Patent and Trademark Office*